United States Patent Office 3,421,878
Patented Jan. 14, 1969

3,421,878
AMMONIUM NITRATE-CALCIUM CARBONATE FERTILIZER MIXTURE
Leonard W. Zahnstecher, Livingston, N.J., assignor to Foster Wheeler Corporation, a corporation of New York
No Drawing. Filed Apr. 6, 1966, Ser. No. 540,527
U.S. Cl. 71—60                6 Claims
Int. Cl. C05c 1/02; C05c 3/00

ABSTRACT OF THE DISCLOSURE

A process for the production of a granular mixed composition of a fertilizer containing ammonium nitrate and calcium carbonate by adding solid calcium carbonate to a solution of ammonium nitrate for forming a uniform slurry and mixing an additive such as a solid compound selected from the group consisting of ammonium sulfate and potassium sulfate, and drying the mixture to form a granular mixed composition.

---

This invention relates to ammonium nitrate-calcium carbonate mixtures, and more particularly, to ammonium nitrate-calcium carbonate mixtures containing an additive for suppressing foam production.

Ammonium nitrate is used in agriculture as a fertilizer. As a fertilizer, it is desirable that the ammonium nitrate be in the form of small pellets or crystals which are convenient to handle. This is accomplished by prilling molten ammonium nitrate in a prilling tower in which the ammonium nitrate is sprayed to form droplets which are dried forming pellets, or by flowing molten ammonium nitrate onto a flat endless belt on which it is cooled, solidified and granulated.

The pellets so produced are disadvantageously hygroscopic, tending to expand and cake when stored, and coalescing due to heat, pressure, and moisture absorbed by the pellets, causing them to agglomerate.

In addition, many crops require a fertilizer that does not add to the acidity of the soil, but instead sweetens the soil. Ammonium nitrate alone does not sweeten the soil.

Powdered calcium carbonate has been added to molten ammonium nitrate to eliminate the above-mentioned disadvantages. Adding limestone (calcium carbonate) and in particular dolomitic limestone to mixed fertilizers sweetens the soil. Furthermore, calcium carbonate reduces the tendency of the pellets to cake.

The addition of the calcium carbonate cannot be a solid phase mixture because the ammonium nitrate prills will separate from the finely ground limestone and the mixture cannot be used in the farmer's prilling machines. Therefore, the calcium carbonate is added to the molten ammonium nitrate and the mixture is prilled together.

However, the addition of calcium carbonate to molten ammonium nitrate is not entirely satisfactory. It reduces the nitrogen content of the treated salts; and a limited reaction occurs between the calcium ions and the nitrate ions, which releases some ammonia. Moreover, the molten mixture continuously forms gases so that the slurry is in a foaming condition which presents difficulty in prilling the slurry mixture, in pumping, in controlling flow and level and in containing the slurry in vessels and equipment. The major difficulty with a frothing mixture is that the foaming vapor locks the prill holes in the sparger plates of the prilling tower.

Various methods have been suggested to reduce foaming, none of which have been fully satisfactory. One method has been to reduce foaming to a limited extent by mixing the ammonium nitrate and calcium carbonate at a temperature which is just a few degrees above the melting point of ammonium nitrate. Another method is to minimize the foaming by diluting the mixture with excessive quantities of water, e.g., 10% or more water in the ammonium nitrate. Still another method is to mechanically eliminate the foaming by providing a falling film evaporator before the prilling tower.

The mixing of ammonium nitrate and calcium carbonate must be accomplished above the melting point, so that the mixture may be prilled, and below the vapor point so that foaming does not occur. With ammonium nitrate and calcium carbonate the range between the melting point and the vapor point is small and foaming cannot be entirely prevented due to the difficulties of temperature control. It has been found that by the addition of an agent to the mixture, such as ammonium monohydrogen phosphate or potassium monohydrogen phosphate, the vapor point or upper temperature limit at which the mixture of ammonium nitrate and calcium carbonate will not gas and foam excessively is extended increasing, to a certain extent, flexibility and ease of prilling.

This invention provides an improved and less costly additive agent for ammonium nitrate and calcium carbonate mixtures which effectively minimizes foaming as well as reduces ammonia and nitrogen loss to a greater extent than any additive heretofore known or used.

More specifically, and in accordance with the present invention, it has been discovered that a small quantity of compound selected from a group consisting of ammonium sulfate and potassium sulfate when added to an ammonium nitrate and calcium carbonate mixture reduces the tendency to gas and foam. Heretofore ammonium sulfate has been known in its own right as a standard fertilizer, but until now it was not known to be suitable in small quantities for inhibiting the foaming tendency of a calcium carbonate-ammonium nitrate mixture for the production of granular prills.

In accordance with the process of the present invention to suppress foam, a small quantity in the range of 0.2 wt. percent to 3.0 wt. percent or more of ammonium sulfate (or potassium sulfate) is added, prior to prilling, to an ammonium nitrate-calcium carbonate melt mixture when the mixture consists of commercial grade calcium carbonate-ammonium nitrate mixtures, an example of commercial grade being 40% calcium carbonate and 60% ammonium nitrate, the ammonium nitrate having a concentration of about 96% with 4% water.

For illustration of the invention, several examples are set forth below.

The addition of 2% ammonium sulfate to the above-mentioned mixture of 40% calcium carbonate and 60% ammonium nitrate, the ammonium nitrate having a concentration of 96% with 4% water, was found to suppress the foaming from the melting point of the mixture, which is approximately 250° F. This extends the temperature range over which foaming is suppressed to a range of 40° F. above the melting point.

The examples demonstrate the non-foaming tendency of the present composition, wherein the foam height was determined at various concentration and temperatures using a number of different additive agents.

A stainless steel tube enclosed in a pressure steam jacket was maintained at a constant temperature by means of a temperature controller. The tube was filled to a height of two inches with a weighted amount of reagent grade ammonium nitrate, constituting 60% by weight of the mixture and a reagent grade of calcium carbonate constituting 40% by weight, the ammonium nitrate having a concentration of 96% with 4% water. Steam was applied to the jacket, the mixture melted and stirred, and after reaching the test temperature the mixer and the batch was allowed to foam. The height of the foam was measured ten minutes after the stirrer stopped. Several tests were conducted and the results are shown in the following table:

| Additive (wt. percent) | Temp. (°F.) | Height of foam (inches) |
|---|---|---|
| None | 260 | 10 |
| Do | 281 | Over 12 |
| Do | 285 | Over 12 |
| 2% ammonium sulfate | 280 | 4.0 |
| Do | 287 | 4.0 |
| 1% ammonium sulfate | 280 | 4.5 |
| Do | 281 | 4.5 |
| 0.5% ammonium sulfate | 280 | 4.5 |
| 0.2% ammonium sulfate | 281 | 5.3 |
| 0.1% ammonium sulfate | 280 | 8 |
| 0.05% ammonium sulfate | 281 | Over 12 |
| 0.2% potassium sulfate | 281 | 5.0 |
| 0.2% sodium sulfate | 281 | Over 12.0 |
| 0.2% sodium aluminum silicate | 281 | 10.0 |
| 0.2% sodium borate | 281 | Over 12 |
| 2% ammonium monohydrogen phosphate | 280 | 6.0 |

It is apparent from the above examples that a 60% ammonium nitrate and 40% calcium carbonate mixture, where the ammonium nitrate contains 96% ammonium nitrate and 4% water foams considerably. At 281–285° F. the foam overflows the twelve-inch high sides of the container. The foaming is less severe at 260° F. However, with the addition of 0.2 wt. or more percent of ammonium sulfate, the foaming was minimized. As indicated, potassium sulfate also minimizes the foaming tendency. The antifoaming tendency of the mixture is considerably better with ammonium sulfate or potassium sulfate than that achieved by the addition of ammonium monohydrogen phosphate as the foam suppressing agent as shown in the table. Ammonium sulfate is also far cheaper in cost than the phosphate type additives. Other additives—such as sodium sulfate, sodium borate, and sodium aluminum silicate—do not appreciably prevent foam production.

It will be appreciated that with the present invention an antifoaming additive has been discovered which is far superior in suppressing foaming (and less expensive) than any additive heretofore used. With the addition of 0.2%–3% of ammonium sulfate, the foaming is sufficiently suppressed to enable prilling to be conducted without difficulty. Furthermore, up to 3%, and even higher, ammonium sulfate in the product pellets does not interfere with the useful activity of the product.

Commercial ranges of calcium carbonate-ammonium nitrate mixtures may range from 10 to 50% calcium carbonate with the remainder (90 to 50%), ammonium nitrate, the ammonium nitrate having between 1 to 5% water and the remainder, ammonium nitrate. Since the calcium carbonate is sparingly soluble in molten mixtures of ammonium nitrate (well under 10%) and only the soluble portion causes the foaming tendency, 0.2% to 2% ammonium sulfate additive effectively neutralizes the foaming for all commercial ranges of calcium carbonate-ammonium nitrate mixtures. Similarly, additional amounts of ammonium sulfate (over 2 or 3%) do not appreciably decrease the foaming tendency since 0.2% to 2% is relatively sufficient to effectively, fully neutralize the small portion of calcium carbonate in solution with the molten ammonium nitrate.

On the other hand, although increasing the ammonium sulfate additive from about 2 to 5% further reduces the foaming to a certain extent, it is relatively expensive to add more than 3 percent of ammonium sulfate. Furthermore, excess quantities of an ammonium sulfate additive decrease the nitrogen content of the fertilizer. In addition, the range of the melting point of the mixture is elevated due to the sulfate content, requiring prilling to be conducted at perhaps undesirably high prilling temperatures.

As will be apparent to those skilled in the art, the preferred proportion of ammonium sulfate required varies somewhat depending on the proportion of ammonium nitrate to calcium carbonate. The normal commercial concentration of calcium carbonate in ammonium nitrate is the 40–60% mixture. Concentrations of calcium carbonate exceeding 50% by weight are, in general, too viscous to handle easily in the piping of a prilling header. Products with less than 10% calcium carbonate are rare, but possible.

It may be understood by those skilled in the art of fertilizer formulations that it is not necessary to add ammonium sulfate salt as such to obtain the concentration of 0.2 to 3 percent by weight ammonium sulfate in the formulation. Ammonium nitrate is obtained by neutralizing ammonia with nitric acid. If a small specific amount of sulfuric acid is substituted for nitric acid then ammonium sulfate of the proper weight ratio forms in the finished product.

The percentages of additive stated herein are all weight percentages, whereas the percentages of the components calcium carbonate and ammonium nitrate are weight ratios (expressed in percentages) of the weight of each component to the combined weight of the calcium carbonate-ammonium nitrate portion of the mixture; similarly the percentages of water or ammonium nitrate are the respective weight ratios (expressed in percentages) of the weight of each component to the weight of the combined ammonium nitrate-water portion of the mixture. For example, an ammonium nitrate-calcium carbonate mixture of 60% ammonium nitrate and 40% calcium carbonate, with the ammonium nitrate containing 96% ammonium nitrate and 4% water, and an ammonium sulfate additive of 2% wt., comprises the following weight percentages of the components: 2% wt. ammonium sulfate; 98% (ammonium nitrate-calcium carbonate) or 60% of 98%=58.8% ammonium nitrate-water or 58.8%×96%=56.45% wt. ammonium nitrate; 58.8%×4%=2.35% wt. water; 40% of 98%=39.2% wt. calcium carbonate. That is, 2% wt. ammonium sulfate; 56.45% wt. ammonium nitrate; 39.2% wt. calcium carbonate; and 2.35% wt. water.

The ammonium sulfate or potassium sulfate agents may be added in the hydrate or anhydrous state, the weight percentages for the hydrate form being the same for the anhydrous state but calculated on a dry basis.

Although not shown in the table, it is reasonable to suspect that the addition of potassium sulfate between .2 and 3% or more would provide good foam suppression as the addition of ammonium sulfate in this range.

Although the invention has been described with respect to specific examples, many other variations, such as the proper ratios of the ammonium sulfate (or potassium sulfate) to be added, within the spirit and scope of the invention as defined in the following claims, will be apparent to those skilled in the art.

What is claimed is:
1. A process for the production of a granular mixed composition, comprising the steps of introducing solid calcium carbonate particles into a molten ammonium nitrate to produce a uniform slurry, mixing a solid compound selected from the group consisting of ammonium sulfate and potassium sulfate, drying the mixture to form a granular mixed composition.

2. A process for the production of a granular mixed composition, according to claim 1 wherein the ammonium sulfate is substantially 0.2% to 5% weight of the mixture.

3. A process for the production of a granular mixed composition, according to claim 2 wherein the ammonium sulfate is added at a slurry temperature above the melting point and below the gassing point.

4. A process for the production of a granular mixed composition, according to claim 2 wherein the mixture is prilled to form the granular mixed composition.

5. A process for the production of a granular mixed composition, according to claim 1, wherein the solid compound is ammonium sulfate, and the ammonium sulfate is substantially 0.2–3% by weight of the mixture and the ammonium nitrate-calcium carbonate slurry content contains about 60% ammonium nitrate and 40% calcium carbonate, said ammonium nitrate having approximately 4% water and 96% ammonium nitrate.

6. A process for the production of a granular mixed composition comprising the steps of neutralizing ammonia with nitric acid and small quantities of sulfuric acid and adding solid calcium carbonate particles thereto, drying the mixture to form a granular product.

References Cited

UNITED STATES PATENTS

| | | | |
|---|---|---|---|
| 2,079,324 | 5/1937 | Krauch et al. | 71—60 |
| 2,762,699 | 9/1956 | Steinle et al. | 71—60 X |
| 3,049,420 | 8/1962 | Weiland | 71—60 X |

FOREIGN PATENTS

| | | |
|---|---|---|
| 828,675 | 1/1958 | Great Britain. |
| 963,605 | 5/1957 | Germany. |
| 941,275 | 3/1962 | Great Britain. |

DONALL H. SYLVESTER, *Primary Examiner.*

T. G. FERRIS, *Assistant Examiner.*

U.S. Cl. X.R.

23—103